US007117059B1

(12) United States Patent
Chiou

(10) Patent No.: US 7,117,059 B1
(45) Date of Patent: Oct. 3, 2006

(54) RUN-TO-RUN CONTROL SYSTEM AND OPERATING METHOD OF THE SAME

(75) Inventor: Hung-Wen Chiou, Hsinchu (TW)

(73) Assignee: ProMOS Technologies Inc., Hsinchu (TW)

(*) Notice: Subject to any disclaimer, the term of this patent is extended or adjusted under 35 U.S.C. 154(b) by 0 days.

(21) Appl. No.: 11/109,168

(22) Filed: Apr. 18, 2005

(51) Int. Cl.
G06F 19/00 (2006.01)
(52) U.S. Cl. .................................. 700/109; 700/31
(58) Field of Classification Search ............ 700/28–31, 700/108–110, 121; 438/5, 14; 702/81–84, 702/182, 183; 716/2, 4
See application file for complete search history.

(56) References Cited

U.S. PATENT DOCUMENTS

| | | | | |
|---|---|---|---|---|
| 6,263,255 B1* | 7/2001 | Tan et al. | .................... | 700/121 |
| 6,449,524 B1* | 9/2002 | Miller et al. | ................ | 700/121 |
| 6,556,884 B1* | 4/2003 | Miller et al. | ................ | 700/121 |
| 6,560,503 B1* | 5/2003 | Toprac et al. | ............... | 700/108 |
| 6,560,506 B1* | 5/2003 | Toprac | ....................... | 700/121 |
| 6,587,744 B1* | 7/2003 | Stoddard et al. | ............ | 700/121 |
| 6,650,957 B1* | 11/2003 | Campbell et al. | ........... | 700/121 |
| 6,701,206 B1* | 3/2004 | Markle et al. | .............. | 700/121 |
| 6,721,616 B1* | 4/2004 | Ryskoski | .................... | 700/108 |
| 6,725,121 B1* | 4/2004 | Pasadyn et al. | ............. | 700/121 |
| 6,728,591 B1* | 4/2004 | Hussey et al. | .............. | 700/121 |
| 6,732,007 B1* | 5/2004 | Pasadyn et al. | ............. | 700/121 |
| 6,745,086 B1* | 6/2004 | Pasadyn et al. | ................ | 700/28 |
| 6,766,214 B1* | 7/2004 | Wang et al. | ................. | 700/121 |
| 6,821,792 B1* | 11/2004 | Sonderman et al. | ........... | 438/5 |
| 6,868,353 B1* | 3/2005 | Ryskoski | ...................... | 702/84 |
| 6,901,340 B1* | 5/2005 | Pasadyn et al. | ............... | 702/84 |
| 6,907,369 B1* | 6/2005 | Markle et al. | ................ | 702/81 |
| 6,912,433 B1* | 6/2005 | Chong et al. | ............... | 700/110 |
| 6,912,437 B1* | 6/2005 | Chong et al. | ............... | 700/121 |
| 2003/0014145 A1* | 1/2003 | Reiss et al. | ................. | 700/121 |
| 2004/0267399 A1* | 12/2004 | Funk | .......................... | 700/121 |
| 2005/0221514 A1* | 10/2005 | Pasadyn et al. | ............... | 438/14 |

OTHER PUBLICATIONS

"Advanced In-line process Control on Sidewall Striation of Deep Trench Etching" By author Hung-Wen Chiou, Selena Tso and Tings Wang, article from 0-7803-8511-X/04 © IEEE 2004.

* cited by examiner

Primary Examiner—Maria N. Von Buhr
(74) Attorney, Agent, or Firm—J.C. Patents

(57) ABSTRACT

A run-to-run control system and a run-to-run controlling method are proposed. The tool process parameters are real-time collected during the semiconductor process is performed and are regarded as the effective factors in the process for providing an optimal operation variables to the tool for the next process run. After modeling the metrology parameters with a set of the tool process parameters with respect to the semiconductor process for its corresponding process run, a set of optimal operation variables is determined by the controller and output to the tool to modify the process recipe of the process. Hence, the process recipe is real-time changed with the process environment to obtain the optimal process performance.

8 Claims, 2 Drawing Sheets

RUN-TO-RUN CONTROL SYSTEM AND OPERATING METHOD OF THE SAME

BACKGROUND OF THE INVENTION

1. Field of Invention

The present invention relates to a control system and a method for operating the system. More particularly, the present invention relates to a run-to-run control system and a run-to-run controlling method.

2. Description of Related Art

Currently, in the semiconductor process, a metrology process for checking the process performance is performed every several process runs. The metrology process includes several measurement categories, such as thickness, depth, uniformity, critical dimension, defect count, film quality etc. When the result of the metrology process of the current tool shows that the process performance is abnormal, a feed-back signal is transmitted to the process controller of the current tool to modify the current process recipe in order to adjust the process performance to be normal. Sometimes, if the performance shifting of the current tool is not serious, a feed-forward signal is transmitted from the current tool to another tool for performing a semiconductor process next to the current semiconductor process in the semiconductor manufacturing procedure. By referring to the feed-forward signal, the performance shifting caused by the current tool can be compensated by the subsequent semiconductor process.

However, the metrology process is not performed for every process run of each wafer since it takes long time to perform the metrology process. Hence, the result of the metrology process does not real-time reflect the timing at which the process performance starts to change due to the variation of the process environment. Even though the feed-back signal used for modifying the current process recipe and the feed-forward signal used for modifying the current process recipe to compensate the previous performance shifting are provided, the modified process recipe does not instantly respond to the change of the process environment. Therefore, the modified process recipe is not the optimal process recipe for the current tool to perform the current semiconductor process on that moment.

SUMMARY OF THE INVENTION

Accordingly, at least one objective of the present invention is to provide a run-to-run control system and a run-to-run controlling method for controlling a tool to perform a semiconductor process for a plurality of process runs. During the process performed by the tool, the tool process parameters are real-time collected. By referring the tool process parameters of the current process run or historic process runs with the metrology parameters of the current process run or the historic process runs, the model for relating the tool process parameters to the metrology parameters is updated for each or several process runs and the process controller can provide the optimal operation variables for the tool every process run based on the modeling result from the model. Hence, the process recipe is real-time changed with the process environment to provide the optimal process performance.

To achieve these and other advantages and in accordance with the purpose of the invention, as embodied and broadly described herein, the invention provides a run-to-run control system for controlling a first tool to perform a first semiconductor process for a plurality of process runs. The run-to-run control system comprises means for receiving a set of tool process parameters of a first process run of the process runs and a set of metrology parameters, wherein the set of the metrology parameters characterizes a process performance of the first tool for each process run and the set of the tool process parameters characterizes a process environment during the first semiconductor process performed by the first tool. The run-to-run control system also comprises means for determining a modeling set by applying the set of metrology parameters and the set of the tool process parameters to a multi-variable modeling function. Further, the run-to-run control system comprises means for determining a set of optimal operation variables for the first tool for a second process run posterior to the first process run by applying a plurality of control rules to the modeling set and means for providing the set of optimal operation variables to the first tool for processing the second process run.

In the present invention, the run-to-run control system may further comprises means for real-time collecting sets of process parameters during the first semiconductor process performed by the first tool in the first process run, means for clustering the process parameters into a plurality of process parameter categories and means for characterizing the process parameters in every process category to form the set of the tool process parameters, wherein the tool process parameters may be obtained by calculating the average, the sum or the maximum value of the process parameters in each category. Moreover, the run-to-run control system also comprises means for determining whether the metrology parameters of the first process run are ready. Therefore, means for determining optimal operation variables is computed by the most updated modeling set created by using the historic metrology parameters and the corresponding tool process parameters prior to the first process run in the process runs when the set of the metrology parameters of the first process run is not ready and means for determining the modeling set is updated by using the metrology and tool process parameters of the first process run when the set of the metrology parameters of the first process run is ready. Further, the run-to-run control system comprises means for providing a feed-forward signal from a second tool to the means for determining the set of optimal operation variables, wherein a second semiconductor process prior to the first semiconductor process in a semiconductor manufacturing procedure is performed by the second tool. Also, in the run-to-run control system, the means for determining the set of optimal operation variables for the first tool for the second process run further refers to the feed-forward signal.

The present invention also provides a method for run-to-run controlling a first tool to perform a first semiconductor process for a plurality of process runs. The method comprises steps of receiving a set of tool process parameters of a first process run of the process runs and a set of metrology parameters, wherein the set of the metrology parameters characterizes a process performance of the first tool for each process run and the set of the tool process parameters characterizes a process environment during the first semiconductor process performed by the first tool. A modeling set is determined by applying the set of metrology parameters and the set of the tool process parameters to a multi-variable modeling function. A set of optimal operation variables for the first tool for a second process run posterior to the first process run is determined by applying a plurality of control rules to the modeling set. The set of optimal operation variables is provided to the first tool for processing the second process run.

In the present invention, before the step of receiving the tool process parameters and the metrology parameters, the method further comprises steps of real-time collecting sets of process parameters during the first semiconductor process is performed by the first tool in the first process run. The process parameters are clustering into a plurality of process parameter categories and the process parameters in every process category are characterized to form the set of the tool process parameters. Moreover, before the step of receiving the tool process parameters and the metrology parameters, the method further comprises steps of determining whether the metrology parameters of the first process run is ready. When the set of metrology parameters of the first process run is not ready, the most updated modeling set created by using the historic metrology parameters and corresponding tool process parameters prior to the first process run is provided. When the set of the metrology parameters of the first process run is ready, the set of the metrology parameters of the first process run is provided to update the modeling set. Before the step of determining the set of optimal operation variables for the first tool for the second process run, the method further comprises steps of providing a feed-forward signal from a second tool, wherein a second semiconductor process prior to the first semiconductor process in a semiconductor manufacturing procedure is performed by the second tool. In addition, the step for determining the set of optimal operation variables for the first tool for the second process run is performed not only by applying the control rules to the modeling set but also by referring to the feed-forward signal.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the invention, a novel run-to-run control system and a novel run-to-run controlling method are proposed. Because the tool process parameters are real-time collected during the process is performed and are regarded as the effective factors in the process for providing a optimal operation variables to the tool for the next run, the process recipe of the process is real-time changed with the process environment to obtain the optimal process performance.

Figure 1:
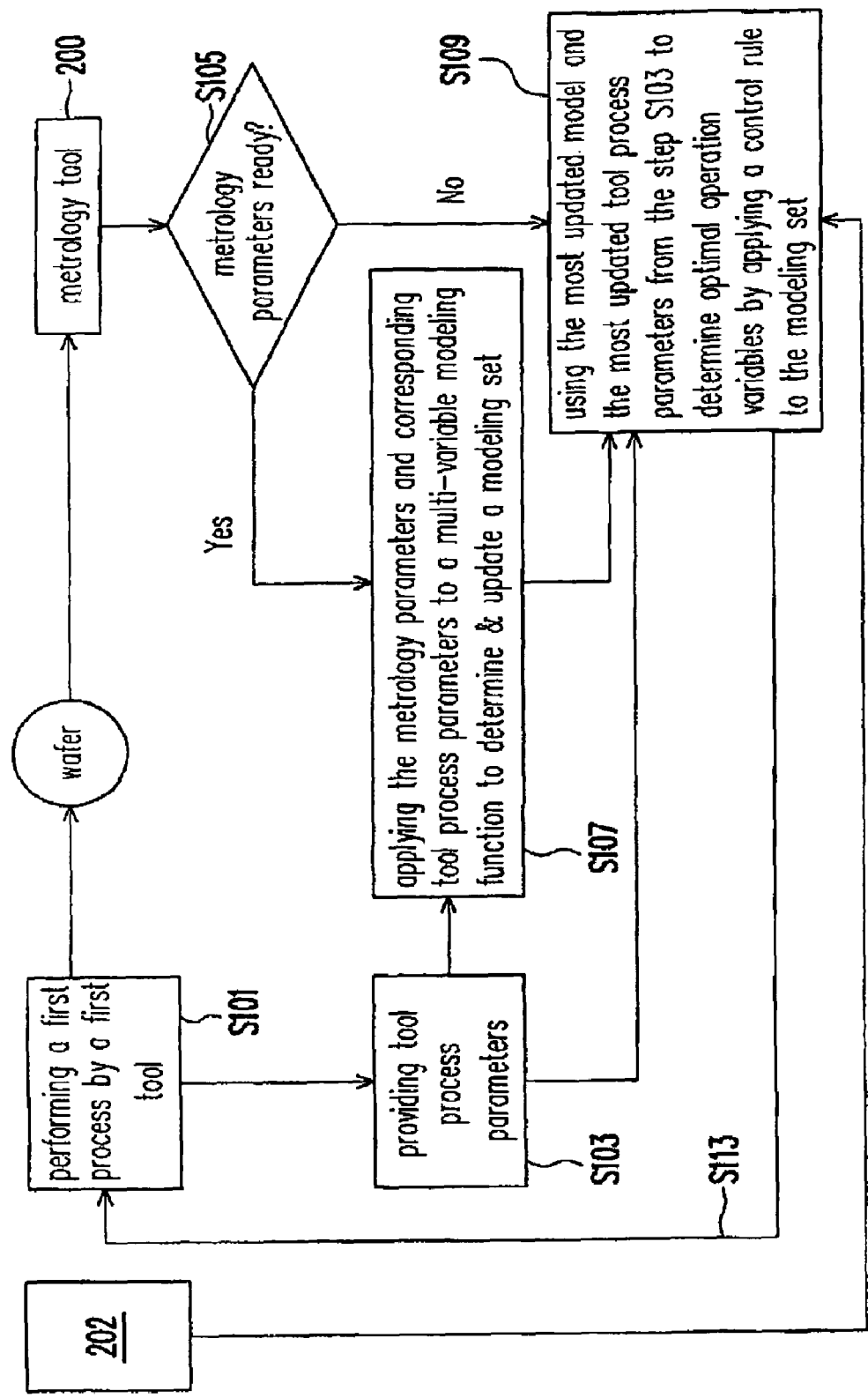
FIG. 1 is a process flow diagram, schematically illustrating a run-to-run controlling method according to one of the preferred embodiment of the present invention.
Figure 2:
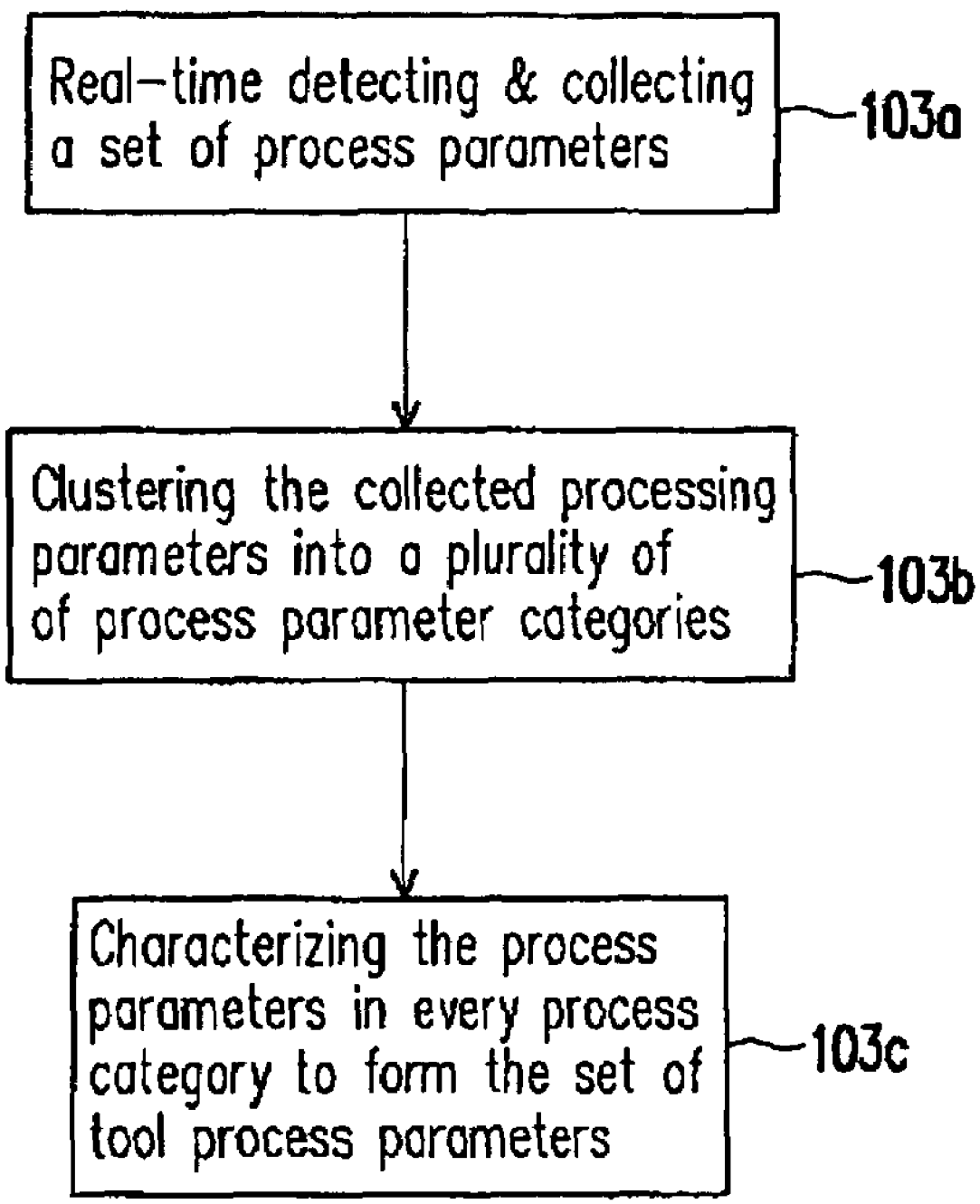
FIG. 2 is a process flow diagram, schematically illustrating a method for providing the set of tool process parameters according to one embodiment of the present invention.

FIG. 1 is a process flow diagram, schematically illustrating a run-to-run controlling method according to one of the preferred embodiment of the present invention. FIG. 2 is a process flow diagram, schematically illustrating a method for providing the set of tool process parameters according to one embodiment of the present invention. As shown in FIG. 1, in the step S101, a first semiconductor process is currently preformed by a first tool for a first process run. Meanwhile, in the step S103, tool sensors (not shown) are real-time detecting a set of tool process parameters. The set of the tool process parameters characterizes a process environment during the first semiconductor process performed by the first tool. The tool process parameters include a plurality of categories comprising the gas flow, the pressure, the power, the process time, temperature, exposure dosage etc. Furthermore, as shown in FIG. 2, the method for the tool sensors to provide the set of the tool process parameters can, for example but not limited to, comprise the steps of real-time detecting a set of process parameters every defined sampling time during the first semiconductor process performed by the first tool in the first process run 103a. Then, the collected process parameters are clustered into a plurality of process parameter categories 103b such as gas flow, the pressure, the power, the process time, temperature and exposure dosage. Furthermore, the process parameters in every process category are characterized to form the set of the tool process parameters 103c. For example but not limited to, for the process parameters in the same process category, the process parameters' characterized value, such as the average value of the process parameters, the sum of the process parameters or the maximum value of the process parameters, is used as the tool process parameter of the category.

After the first tool is done with the first semiconductor process for the first process run, a metrology process 200 is performed by a metrology tool to evaluate the process performance of the first tool for the first process run. In the step S105, a decision for determining whether the metrology parameter of the first process run is ready is made. That is, in this step, the metrology process for obtaining the metrology parameters representing the process performance of the first tool for the first process run may not be finished. When the determining result is that the metrology parameters of the first process run are not ready, a most updated modeling set created by using the historic metrology and the tool process parameters from step S103 are provided for the next step S109. In other words, the modeling set is not updated. When the determining result shows that the metrology parameters of the first process run are ready, the metrology parameters of the first process run are provided to update the modeling set for the next step S107. The categories of the metrology parameters include, for example, thickness, depth, critical dimension, film quality, defect counts overlay offset parameters, yield etc.

In the step S107, both the set of metrology parameters and the corresponding set of the tool process parameters are provided to a modeling means. Based on a model, the modeling means relates the set of the metrology parameters to the tool process parameters to generate a modeling set. The model can be a multi-variable function with the tool process parameters as the input variables of the function and with the metrology parameters as output of the function. The model means can be a computer program code consisted of several sub-program code and program segments. Further, the modeling set comprises tool process arguments and metrology arguments.

Thereafter, in the step S109, the most updated modeling set and the most updated tool process parameters from the step S103 are provided to a process controller (not shown). In the process controller, by applying a plurality of control rules to the modeling set, a set of optimal operation variables for the first tool for a second process run subsequent to the first process run is determined. The control rules may comprise the concept of maximizing a portion of the metrology arguments such as yield and minimizing a portion of the metrology arguments such as overlay effect in the modeling set. More specifically, for the tool process arguments with respect to the yield of the metrology arguments, the value of the tool process arguments is adjusted to maximize the value of the metrology argument, wherein the adjustment range for the value of the tool process arguments is limited by the operation variable range of the first tool. This concept can be represented by the following expression:

Max(Yield), wherein Yield=function $(x_1, x_2 \ldots)$,
$x_1$=process Process Arguments argument 1, $x_2$=process argument 2 and the formula of Yield function is created in the step S107.

Meanwhile, for the tool process arguments with respect to the metrology arguments possessing the need for meeting the ideal performance values, the value of the tool process arguments is adjusted to minimizing the summation value of difference between the metrology arguments and the ideal performance values/target value respectively, wherein the adjustment range for the value of the tool process arguments is subject to the operation variable range of the first tool. This concept can be represented by the following expression:

Min$\Sigma$(Metrology Arguments–Target value)$^2$Process Arguments, wherein Metrology arguments=function $(x_1, x_2, \ldots)$, $x_1$=process argument 1, $x_2$=process argument 2 and the formula of the function is created in the step S107.

In addition, in the step S111, a feed-forward signal from a second tool 202 is provided to the controller while the set of optimal operation variables is going to be determined, wherein a second semiconductor process prior to the first semiconductor process in a semiconductor manufacturing procedure is performed by the second tool. Therefore, the decision for determining the set of the optimal operation variables not only depends on applying the control rules to the modeling set but also takes the feed-forward signal into consideration. Hence, the optimal operation variables not only real-time changes with the variation of the process environment but also compensates the performance shifting caused by a pre-tool during a pre-semiconductor process performed by the pre-tool, wherein the pre-semiconductor is prior to the first semiconductor process in the semiconductor manufacturing procedure.

Moreover, in the step S113, the set of optimal operation variables for the first tool is input from the process controller to the first tool in order to modify the process recipe for the second process run.

The run-to-run control system for controlling the first tool to perform the first semiconductor process for several process runs comprises means for receiving a set of tool process parameters of a first process run of the process runs and a set of metrology parameters, means for determining a modeling set, means for determining a set of optimal operation variables for the first tool and means for providing the set of optimal operation variables to the first tool for processing the second process run. More specifically, the set of the metrology parameters characterizes a process performance of the first tool for each process run and the set of the tool process parameters characterizes a process environment during the first semiconductor process performed by the first tool. Also, the modeling set can be determined by applying the set of metrology parameters and the set of the tool process parameters to a multi-variable modeling function (the step S107). Moreover, the set of optimal operation variables is determined by applying at least a control rule to the modeling set (the step S109). Practically, the means in the run-to-run control system for controlling the first tool corresponding to the steps of the run-to-run controlling method mentioned above can be represented by the computer program codes respectively. That is, most of the steps performed in the run-to-run control system can be performed by executing a computer program code via at least one electric calculator, such as computer. Furthermore, the computer program code mentioned above can be a program code consisted of several sub-program code and program segments.

In addition, the run-to-run control system further comprises several tool sensors for real-time collecting sets of process parameters during the first semiconductor process performed by the first tool in the first process run, means for clustering the process parameters into a plurality of process parameter categories and means for characterizing the process parameters in every process category to form the set of the tool process parameters. Preferably, the means mentioned here in the run-to-run control system can be represented by the computer program codes respectively. That is, most of the steps performed in the run-to-run control system can be performed by executing a computer program code via at least one electric calculator, such as computer. Furthermore, the computer program code mentioned above can be a program code consisted of several sub-program code and program segments.

Moreover, the run-to-run control system includes means for determining whether the metrology parameters of the first process run are ready (the step S105). When the set of the metrology parameters of the first process run is ready, the modeling set is updated using the metrology parameters and the tool process parameters of the first process run. Also, the run-to-run control system further comprises means for providing a feed-forward signal from a second tool (the step 111) to the means for determining the set of optimal operation variables, wherein a second semiconductor process prior to the first semiconductor process in a semiconductor manufacturing procedure is performed by the second tool. The set of optimal operation variables for the first tool for the second process run is determined by further referring to the feed-forward signal (the step S109). For example but not limited to, the means mentioned here in the run-to-run control system can be represented by the computer program codes respectively. That is, most of the steps performed in the run-to-run control system can be performed by executing a computer program code via at least one electric calculator, such as computer. Furthermore, the computer program code mentioned above can be a program code consisted of several sub-program code and program segments.

During the process performed by the tool, the tool process parameters which truly reflect the current process environment for the current process run are real-time collected. By referring the tool process parameters of the current process run with the most updated model by using the latest metrology parameters of the current process run or the historic process runs and the corresponding tool process parameters, the process controller provides the optimal operation variables for the tool every process run. Hence, the process recipe is real-time changed with the process environment to provide the optimal process performance.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A run-to-run control system for controlling a first tool to perform a first semiconductor process for a plurality of process runs, the run-to-run control system comprising:
   means for determining whether a set of metrology parameters of the first process is ready;
   means for receiving a set of tool process parameters of a first process run of the process runs and the set of the metrology parameters when the set of the metrology parameters of the first process run is ready, wherein the set of the metrology parameters characterizes a process performance of the first tool for each process run and the set of the tool process parameters characterizes a process environment during the first semiconductor process performed by the first tool;
   means for determining and updating a modeling set by applying the set of metrology parameters and the set of the tool process parameters to a multi-variable modeling function;
   means for determining a set of optimal operation variables for the first tool for a second process run posterior to the first process run by applying at least a control rule to the modeling set; and
   means for providing the set of optimal operation variables to the first tool for processing the second process run.

2. The run-to-run control system of claim 1 further comprising:
   means for real-time collecting sets of process parameters during the first semiconductor process performed by the first tool in the first process run;
   means for clustering the process parameters into a plurality of process parameter categories; and
   means for characterizing the process parameters in every process category to form the set of the tool process parameters.

3. The run-to-run control system of claim 1 further comprising:
   means for providing a feed-forward signal from a second tool to the means for determining the set of optimal operation variables, wherein a second semiconductor process prior to the first semiconductor process in a semiconductor manufacturing procedure is performed by with the second tool.

4. The run-to-run control system of claim 3, wherein the means for determining the set of optimal operation variables for the first tool for the second process run further refers to the feed-forward signal.

5. A method for run-to-run controlling a first tool to perform a first semiconductor process for a plurality of process runs, the method comprising:
   determining whether a set of metrology parameters of the first process run is ready;
   receiving a set of tool process parameters of a first process run of the process runs and the set of the metrology parameters when the set of the metrology parameters of the first process run is ready, wherein the set of the metrology parameters characterizes a process performance of the first tool for each process run and the set of the tool process parameters characterizes a process environment during the first semiconductor process is performed by the first tool;
   determining and updating a modeling set by applying the set of metrology parameters and the set of the tool process parameters to a multi-variable modeling function;
   determining a set of optimal operation variables for the first tool for a second process run posterior to the first process run by applying a plurality of control rules to the modeling set; and
   providing the set of optimal operation variables to the first tool for processing the second process run.

6. The method of claim 5, wherein before the step of receiving the tool process parameters and the metrology parameters, the method further comprises:
   real-time collecting sets of process parameters during the first semiconductor process performed by the first tool in the first process run;
   clustering the process parameters into a plurality of process parameter categories; and
   characterizing the process parameters in every process category to form the set of the tool process parameters.

7. The method of claim 6, wherein before the step of determining the set of optimal operation variables for the first tool for the second process run, the method further comprises steps of:
   providing a feed-forward signal from a second tool, wherein a second semiconductor process prior to the first semiconductor process in a semiconductor manufacturing procedure is performed by the second tool.

8. The method of claim 7, wherein the step for determining the set of optimal operation variables for the first tool for the second process run is performed not only by applying the control rules to the modeling set but also by referring to the feed-forward signal.

* * * * *